US012592960B2

(12) United States Patent (10) Patent No.: US 12,592,960 B2
Zeng et al. (45) Date of Patent: Mar. 31, 2026

(54) COMMUNICATION METHOD AND APPARATUS

(71) Applicant: HUAWEI TECHNOLOGIES CO., LTD., Shenzhen (CN)

(72) Inventors: Yu Zeng, Shanghai (CN); Tingting Geng, Shenzhen (CN); Qinghai Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 57 days.

(21) Appl. No.: 18/640,846

(22) Filed: Apr. 19, 2024

(65) Prior Publication Data

US 2024/0314160 A1 Sep. 19, 2024

Related U.S. Application Data

(63) Continuation of application No. PCT/CN2022/126518, filed on Oct. 20, 2022.

(30) Foreign Application Priority Data

Oct. 21, 2021 (CN) .......................... 202111228355.2

(51) Int. Cl.
H04L 9/40 (2022.01)

(52) U.S. Cl.
CPC ...... H04L 63/1441 (2013.01); H04L 63/0227 (2013.01); H04L 63/20 (2013.01)

(58) Field of Classification Search
CPC . H04L 63/1441; H04L 63/0227; H04L 63/20; H04L 63/02272

USPC .......................................................... 726/23
See application file for complete search history.

(56) References Cited

U.S. PATENT DOCUMENTS

| | | | | |
|---|---|---|---|---|
| 11,297,083 | B1 * | 4/2022 | Kuppa ................ | H04L 63/1458 |
| 11,755,743 | B2 * | 9/2023 | Sharma ................ | G06F 21/55 |
| | | | | 726/25 |
| 2018/0225471 | A1 | 8/2018 | Goyal et al. | |
| 2021/0089819 | A1 * | 3/2021 | Tschiatschek ...... | G06F 21/6245 |
| 2021/0337420 | A1 | 10/2021 | Lo et al. | |
| 2021/0374247 | A1 * | 12/2021 | Sultana ................ | G06F 21/57 |
| 2021/0397858 | A1 * | 12/2021 | Buerkle ........... | B60W 60/0016 |

(Continued)

FOREIGN PATENT DOCUMENTS

| | | |
|---|---|---|
| CN | 112883024 A | 6/2021 |
| WO | 2019148960 A1 | 8/2019 |

*Primary Examiner* — Amare F Tabor
(74) *Attorney, Agent, or Firm* — Rimon PC

(57) ABSTRACT

The present disclosure provides a communication method and apparatus, to improve security of applying artificial intelligence in a network. The method includes obtaining first information, where the first information indicates an anti-attack policy of first data, and the first data includes training data and/or inference data of a model; determining the first data based on the first information; and sending the first data, wherein the first data is used to perform model training and/or determine an inference result. The first information can be at least one of the following: data source blocklist information of the first data and/or data source trustlist information of the first data, information indicating a data preprocessing manner of the first data, or information indicating a data enhancement manner of the first data.

15 Claims, 7 Drawing Sheets

(56) References Cited

U.S. PATENT DOCUMENTS

| | | | |
|---|---|---|---|
| 2022/0269949 A1* | 8/2022 | Scheideler | G06F 21/56 |
| 2023/0297831 A1* | 9/2023 | Saadi | G06N 3/08 |
| | | | 706/25 |

* cited by examiner

Access network
device 110

Terminal
device 120

Terminal
device 130

COMMUNICATION METHOD AND APPARATUS

CROSS-REFERENCE TO RELATED APPLICATIONS

This application is a continuation of International Application No. PCT/CN2022/126518, filed on Oct. 20, 2022, which claims priority to Chinese Patent Application No. 202111228355.2, filed on Oct. 21, 2021. The disclosures of the aforementioned applications are herein incorporated by reference in their entireties.

TECHNICAL FIELD

The present disclosure relates to the field of communication technologies, and in particular, to a communication method and apparatus.

BACKGROUND

In a wireless communication network, for example, in a mobile communication network, increasingly diversified services are supported by the network. Therefore, increasingly diversified requirements need to be met. For example, the network needs to be capable of supporting an ultra-high rate, ultra-low latency, and/or a massive connection. These features make network planning, network configuration, and/or resource scheduling increasingly complex. In addition, because a function of the network is increasingly powerful, for example, a supported spectrum is increasingly high, and new technologies such as a high-order multiple-input multiple-output (MIMO) technology, beamforming, and/or beam management are supported, network energy saving becomes a hot research topic. These new requirements, scenarios, and features bring an unprecedented challenge to network planning, operation and maintenance, and efficient operation. To meet this challenge, an artificial intelligence technology may be introduced into the wireless communication network, to implement network intelligence. Based on this, how to effectively implement artificial intelligence in the network is a problem worth studying.

SUMMARY

The present disclosure provides a communication method and apparatus, to improve security of artificial intelligence.

According to a first aspect, the present disclosure provides a communication method. The method includes: obtaining first information, where the first information indicates an anti-attack policy of first data, and the first data includes training data and/or inference data of a model; and determining the first data based on the first information.

In the foregoing design, the anti-attack policy of the training data and/or the inference data is configured, so that reliability of the training data and/or the inference data can be enhanced, an attack threat in a model training phase and/or a model inference phase can be effectively prevented, and security of artificial intelligence can be improved.

In a possible design, the first information includes at least one of the following: data source blocklist information of the first data and/or data source trustlist information of the first data; information indicating a data preprocessing manner of the first data; or information indicating a data enhancement manner of the first data. According to data processing solutions from a plurality of perspectives, the anti-attack policy of the training data and/or the inference data is indicated, so that the reliability of the training data and/or the inference data can be effectively enhanced.

In a possible design, the obtaining first information includes: obtaining the first information from a first node, where the first node is configured to perform model training and/or inference.

In a possible design, the method further includes: sending the first data to the first node. The first node may perform model training and/or inference by using the first data.

In a possible design, the determining the first data based on the first information includes: sending second information to at least one second node based on the first information, where the second information indicates an anti-attack policy of second data, and the first data includes the second data; receiving the second data from the at least one second node; and determining the first data based on the second data of the at least one second node.

In the foregoing design, the anti-attack policy of the first data is distributed to the at least one second node, and the at least one second node may determine in parallel a part of the first data, for example, the second data. This helps improve data processing efficiency.

In a possible design, the second information includes at least one of the following: data source blocklist information of the second data and/or data source trustlist information of the second data; information indicating a data preprocessing manner of the second data; or information indicating a data enhancement manner of the second data.

In a possible design, the determining the first data based on the first information includes: obtaining original data; and processing the original data based on the first information, to obtain the first data. In this design, the obtained original data is not directly used for the model training and/or inference, but is processed based on the first information. This can effectively prevent the original data from causing an attack threat or a privacy leakage in the model training phase/model inference phase. In this way, the security of artificial intelligence is improved.

In a possible design, the obtaining original data includes: obtaining the original data from at least one second node.

In a possible design, the method further includes: obtaining data collection configuration information from the first node, where the data collection configuration information includes at least one of the following: a type of the original data; a time period for collecting the original data; or a source of the original data. According to such a design, data for matching the model training and/or inference may be collected, so that the model training and/or inference is more targeted. This helps improve application performance of artificial intelligence.

In a possible design, the method is applied to a third node, the first node is configured to perform model training, the first data includes the inference data of the model, and the third node is configured to perform model inference. Such a design may be applied to a scenario in which model training and model inference are performed by different nodes. The anti-attack policy is executed for the training data and the inference data, so that secure use of artificial intelligence functions on a plurality of nodes can be ensured.

According to a second aspect, the present disclosure provides a communication method. The method includes: sending first information, where the first information indicates an anti-attack policy of first data, and the first data includes training data and/or inference data of a model; and obtaining the first data.

For descriptions of the first information, refer to the first aspect. Details are not described herein again.

In a possible design, the sending first information includes: sending the first information to at least one third node.

In a possible design, the obtaining the first data includes: receiving the first data from the at least one third node.

In a possible design, the method is applied to a first node, and the first node is configured to perform model training and/or inference.

According to a third aspect, the present disclosure provides a communication method. The method includes: obtaining second information, where the second information indicates an anti-attack policy of second data, the second data belongs to first data, and the first data includes training data and/or inference data of a model; and sending the second data.

For descriptions of the second information, refer to the first aspect. Details are not described herein again.

According to a fourth aspect, the present disclosure provides a communication apparatus. The communication apparatus may be a third node, may be an apparatus in the third node, or may be an apparatus that can be used together with the third node. In a design, the communication apparatus may include modules that are in one-to-one correspondence with the method/operation/step/action described in the first aspect. The modules may be implemented by a hardware circuit, software, or a combination of the hardware circuit and the software. In a design, the communication apparatus may include a processing module and a communication module.

For example, the communication module is configured to obtain first information, where the first information indicates an anti-attack policy of first data, and the first data includes training data and/or inference data of a model.

The processing module is configured to determine the first data based on the first information.

For descriptions of the first information, refer to the first aspect. Details are not described herein again.

In a possible design, the communication module is further configured to obtain the first information from a first node, where the first node is configured to perform model training and/or inference.

In a possible design, the communication module is further configured to send the first data to the first node. The first node may perform model training and/or inference by using the first data.

In a possible design, the processing module is configured to: send second information to at least one second node based on the first information, where the second information indicates an anti-attack policy of second data, and the first data includes the second data; receive the second data from the at least one second node; and determine the first data based on the second data of the at least one second node.

For descriptions of the second information, refer to the first aspect. Details are not described herein again.

In a possible design, the communication module is further configured to obtain original data; and the processing module is further configured to process the original data based on the first information, to obtain the first data.

In a possible design, the communication module is further configured to obtain the original data from at least one second node.

In a possible design, the communication module is further configured to obtain data collection configuration information from the first node, where the data collection configuration information includes at least one of the following: a type of the original data; a time period for collecting the original data; or a source of the original data.

In a possible design, the first node is configured to perform model training, the first data includes the inference data of the model, and the third node is configured to perform model inference.

According to a fifth aspect, the present disclosure provides a communication apparatus. The communication apparatus may be a first node, may be an apparatus in the first node, or may be an apparatus that can be used together with the first node. In a design, the communication apparatus may include modules that are in one-to-one correspondence with the method/operation/step/action described in the second aspect. The modules may be implemented by a hardware circuit, software, or a combination of the hardware circuit and the software. In a design, the communication apparatus may include a processing module and a communication module.

For example, the processing module is configured to send first information by using the communication module, where the first information indicates an anti-attack policy of first data, and the first data includes training data and/or inference data of a model.

The communication module is configured to obtain the first data.

For descriptions of the first information, refer to the first aspect. Details are not described herein again.

In a possible design, the processing module is configured to send the first information to at least one third node by using the communication module.

In a possible design, the communication module is configured to receive the first data from the at least one third node.

In a possible design, the first node is configured to perform model training and/or inference.

According to a sixth aspect, the present disclosure provides a communication apparatus. The communication apparatus may be a second node, may be an apparatus in the second node, or may be an apparatus that can be used together with the second node. In a design, the communication apparatus may include modules that are in one-to-one correspondence with the method/operation/step/action described in the third aspect. The modules may be implemented by a hardware circuit, software, or a combination of the hardware circuit and the software. In a design, the communication apparatus may include a processing module and a communication module.

For example, the communication module is configured to obtain second information, where the second information indicates an anti-attack policy of second data, the second data belongs to first data, and the first data includes training data and/or inference data of a model.

The processing module is configured to determine the second data based on the second information.

In addition, the communication module is further configured to send the second data. For example, the second data is sent to a third node.

For descriptions of the second information, refer to the first aspect. Details are not described herein again.

According to a seventh aspect, the present disclosure provides a communication apparatus. The communication apparatus includes a processor, where the processor is configured to implement the method according to the first aspect. The communication apparatus may further include a memory, where the memory is configured to store instructions and data. The memory is coupled to the processor, and when the processor executes the instructions stored in the memory, the method according to the first aspect may be implemented. The communication apparatus may further include a communication interface. The communication interface is used by the apparatus to communicate with another device. For example, the communication interface may be a transceiver, a circuit, a bus, a module, or a communication interface of another type. In a possible device, the communication apparatus includes:

the memory, configured to store program instructions; and the processor, configured to obtain first information by using the communication interface, where the first information indicates an anti-attack policy of first data, and the first data includes training data and/or inference data of a model.

The processor is further configured to determine the first data based on the first information.

According to an eighth aspect, the present disclosure provides a communication apparatus. The communication apparatus includes a processor, where the processor is configured to implement the method according to the second aspect. The communication apparatus may further include a memory, where the memory is configured to store instructions and data. The memory is coupled to the processor, and when the processor executes the instructions stored in the memory, the method according to the second aspect may be implemented. The communication apparatus may further include a communication interface. The communication interface is used by the apparatus to communicate with another device. For example, the communication interface may be a transceiver, a circuit, a bus, a module, or a communication interface of another type. In a possible device, the communication apparatus includes:

the memory, configured to store program instructions; and the processor, configured to: send first information by using the communication interface, where the first information indicates an anti-attack policy of first data, and the first data includes training data and/or inference data of a model; and obtain the first data by using the communication interface.

According to a ninth aspect, the present disclosure provides a communication apparatus. The communication apparatus includes a processor, where the processor is configured to implement the method according to the third aspect. The communication apparatus may further include a memory, where the memory is configured to store instructions and data. The memory is coupled to the processor, and when the processor executes the instructions stored in the memory, the method according to the third aspect may be implemented. The communication apparatus may further include a communication interface. The communication interface is used by the apparatus to communicate with another device. For example, the communication interface may be a transceiver, a circuit, a bus, a module, or a communication interface of another type. In a possible device, the communication apparatus includes:

the memory, configured to store program instructions; and the processor, configured to obtain second information by using the communication interface, where the second information indicates an anti-attack policy of second data, the second data belongs to first data, and the first data includes training data and/or inference data of a model.

The processor is further configured to determine the second data based on the second information.

According to a tenth aspect, the present disclosure provides a communication system. The communication system includes at least two of the following communication apparatuses: the communication apparatus according to the fourth aspect and any one of the possible designs of the fourth aspect, the communication apparatus according to the fifth aspect and any one of the possible designs of the fifth aspect, or the communication apparatus according to the sixth aspect.

According to an eleventh aspect, the present disclosure provides a communication system. The communication system includes at least two of the following communication apparatuses: the communication apparatus according to the seventh aspect and any one of the possible designs of the seventh aspect, the communication apparatus according to the eighth aspect and any one of the possible designs of the eighth aspect, or the communication apparatus according to the ninth aspect.

According to a twelfth aspect, the present disclosure further provides a computer program. When the computer program is run on a computer, the computer is enabled to perform the method according to any one of the first aspect, the second aspect, or the third aspect.

According to a thirteenth aspect, the present disclosure further provides a computer program product, including instructions. When the instructions are run on a computer, the computer is enabled to perform the method according to any one of the first aspect, the second aspect, or the third aspect.

According to a fourteenth aspect, the present disclosure further provides a computer-readable storage medium. The computer-readable storage medium stores a computer program or instructions. When the computer program is run or the instructions are run on a computer, the computer is enabled to perform the method according to the first aspect, the second aspect, or the third aspect.

According to a fifteenth aspect, the present disclosure further provides a chip. The chip is configured to read a computer program stored in a memory, to perform the method according to the first aspect, the second aspect, or the third aspect.

According to a sixteenth aspect, the present disclosure further provides a chip system. The chip system includes a processor, and is configured to support a computer apparatus in implementing the method according to the first aspect, the second aspect, or the third aspect. In a possible design, the chip system further includes a memory, and the memory is configured to store a program and data for the computer apparatus. The chip system may include a chip, or may include a chip and another discrete component.

DESCRIPTION OF EMBODIMENTS

Figure 1A:
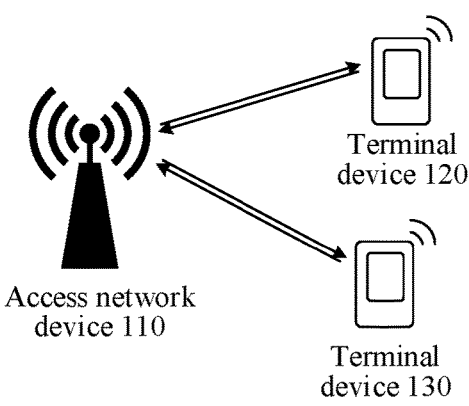
FIG. 1A is a schematic diagram of a structure of a communication system.

To make objectives, technical solutions, and advantages of the present disclosure clearer, the following further describes the present disclosure in detail with reference to accompanying drawings.

In the present disclosure, "at least one" means one or more. "A plurality of" means two or more than two. The term "and/or" describes an association relationship between associated objects, and represents that three relationships may exist. For example, A and/or B may represent the following three cases: Only A exists, both A and B exist, and only B exists. The character "/" generally represents an "or" relationship between the associated objects. In addition, it should be understood that terms such as "first" and "second" may be used to describe objects in the present disclosure, but these objects should not be limited to these terms. These terms are only used to distinguish between the objects.

The terms "include", "have", and any other variant thereof mentioned in the following descriptions of the present disclosure are intended to cover a non-exclusive inclusion. For example, a process, a method, a system, a product, or a device that includes a series of steps or units is not limited to listed steps or units, but optionally further includes other unlisted steps or units, or optionally further includes another inherent step or unit of the process, the method, the product, or the device. It should be noted that in the present disclosure, terms such as "example" or "for example" refer to giving an example, an illustration, or a description. Any method or design solution described as "example" or "for example" in the present disclosure should not be considered as being more preferred or having more advantages than another method or design solution. Use of the terms such as "example" or "for example" is intended to present a related concept in a more specific manner.

Technologies provided in the present disclosure may be applied to various communication systems. For example, the communication system may be a $3^{rd}$ generation (3G) communication system (for example, a universal mobile telecommunication system (UMTS)), a $4^{th}$ generation (4G) communication system (for example, a long term evolution (LTE) system), a $5^{th}$ generation (5G) communication system, a worldwide interoperability for microwave access (WiMAX) or a wireless local area network (WLAN) system, a converged system of a plurality of systems, or a future communication system such as a 6G communication system. The 5G communication system may also be referred to as a new radio (NR) system.

A network element in the communication system may send a signal to another network element or receive a signal from another network element. The signal may include information, configuration information, data, or the like. The network element may also be referred to as an entity, a network entity, a device, a communication device, a communication module, a node, a communication node, or the like. In the present disclosure, the network element is used as an example for description. For example, the communication system may include at least one terminal device and at least one access network device. A network element for sending the configuration information may be the access network device, and a network element for receiving the configuration information may be the terminal device. In addition, it may be understood that, if the communication system includes a plurality of terminal devices, the plurality of terminal devices may also send signals to each other. In other words, both the network element for sending the configuration information and the network element for receiving the configuration information may be terminal devices.

FIG. 1A shows a communication system. For example, the communication system includes an access network device 110 and two terminal devices, namely, a terminal device 120 and a terminal device 130. At least one of the terminal device 120 and the terminal device 130 may send uplink data to the access network device 110, and the access network device 110 may receive the uplink data. The access network device may send downlink data to at least one of the terminal device 120 and the terminal device 130.

The following describes in detail the terminal devices and the access network device in FIG. 1A.

(1) Access Network Device

The access network device may be a base station (BS), and the access network device may also be referred to as a network device, an access node (AN), or a radio access node (RAN). The access network device may be connected to a core network (for example, a core network in LTE or a core network in 5G), and the access network device may provide a radio access service for the terminal device. The access network device includes, for example, but is not limited to at least one of the following: a base station, a next generation NodeB (gNB) in 5G, an access network device in an open radio access network (O-RAN), an evolved NodeB (eNB), a radio network controller (RNC), a NodeB (NB), base station controller (BSC), a base transceiver station (BTS), a home base station (for example, home evolved NodeB, or home NodeB, HNB), a baseband unit (BBU), a transmission reception point (TRP), a transmitting point (TP), and/or a mobile switching center, or the like. Alternatively, the access network device may be a central unit (CU), a distributed unit (DU), a central unit control plane (CU-CP) node, or a central unit user plane (CU-UP) node. Alternatively, the access network device may be a relay station, an access point, an in-vehicle device, a wearable device, an access network device in a future evolved public land mobile network (PLMN), or the like.

In the present disclosure, a communication apparatus for implementing functions of the access network device may be an access network device, may be a network device having some functions of the access network device, or may be an apparatus that can support the access network device in implementing the functions, for example, a chip system, a hardware circuit, a software module, or a combination of a hardware circuit and a software module. The apparatus may be installed in the access network device. In the method of the present disclosure, an example in which the communication apparatus for implementing the functions of the access network device is the access network device is used for description.

(2) Terminal Device

The terminal device is also referred to as a terminal, user equipment (UE), a mobile station (MS), a mobile terminal (MT), or the like, and is a device that provides voice and/or data connectivity for a user. The terminal device may communicate with one or more core networks via the access network device. The terminal device includes a handheld device having a wireless connection function, another processing device connected to a wireless modem, an in-vehicle device, or the like. The terminal device may be a portable, pocket-sized, handheld, computer built-in, or in-vehicle mobile apparatus. Some examples of the terminal device are: a personal communication service (PCS) phone, a cordless phone, a session initiation protocol (SIP) phone, a wireless local loop (WLL) station, a personal digital assistant (PDA), a wireless network camera, a mobile phone (mobile phone), a tablet computer, a notebook computer, a palmtop computer, a mobile internet device (MID), a wearable device such as a smart watch, a virtual reality (VR) device, an augmented reality (AR) device, a wireless terminal in industrial control, a terminal in an internet of vehicles system, a wireless terminal in self driving, a wireless terminal in a smart grid, a wireless terminal in transportation safety, a wireless terminal in a smart city such as a smart fueler, a terminal device on a high-speed railway, and a wireless terminal in a smart home, such as a smart acoustic, a smart coffee machine, and a smart printer.

In the present disclosure, a communication apparatus for implementing functions of the terminal device may be a terminal device, may be a terminal device having some terminal functions, or may be an apparatus that can support the terminal device in implementing the functions, for example, a chip system. The apparatus may be installed in the terminal device. In the present disclosure, the chip system may include a chip, or may include a chip and another discrete component. In the technical solutions provided in the present disclosure, an example in which the communication apparatus for implementing the functions of the terminal device is the terminal device or UE is used for description.

(3) Protocol Layer Structure Between the Access Network Device and the Terminal Device Communication between the access network device and the terminal device complies with a protocol layer structure. The protocol layer structure may include a control plane protocol layer structure and a user plane protocol layer structure. For example, the control plane protocol layer structure may include functions of protocol layers, such as a radio resource control (RRC) layer, a packet data convergence protocol (PDCP) layer, a radio link control (RLC) layer, a media access control (MAC) layer, and a physical layer. For example, the user plane protocol layer structure may include functions of protocol layers such as a PDCP layer, an RLC layer, a MAC layer, and a physical layer. In a possible implementation, a service data adaptation protocol (SDAP) layer may be further included above the PDCP layer.

Optionally, the protocol layer structure between the access network device and the terminal may further include an artificial intelligence (AI) layer, to communicate data related to an AI function.

Data transmission between the access network device and the terminal device is used as an example. The data transmission needs to pass through the user plane protocol layer, for example, through the SDAP layer, the PDCP layer, the RLC layer, the MAC layer, and the physical layer. The SDAP layer, the PDCP layer, the RLC layer, the MAC layer, and the physical layer may also be collectively referred to as an access stratum. Because a data transmission direction includes sending or receiving, each layer is further divided into a sending part and a receiving part. Downlink data transmission is used as an example. After obtaining data from an upper layer, the PDCP layer transmits the data to the RLC layer and the MAC layer. Then, the MAC layer generates a transport block, and wireless transmission is performed through the physical layer. The data is correspondingly encapsulated at each layer. For example, data received by a layer from an upper layer of the layer is considered as a service data unit (SDU) of the layer. After being encapsulated at the layer, the data becomes a protocol data unit (PDU), and then transmitted to a next layer.

For example, the terminal device may further have an application layer and a non-access stratum. The application layer may be used to provide a service for an application installed in the terminal device. For example, downlink data received by the terminal device may be sequentially transmitted from the physical layer to the application layer, and then provided by the application layer for the application. For another example, the application layer may obtain data generated by the application, sequentially transmit the data to the physical layer, and send the data to another communication apparatus. The non-access stratum may be used to forward user data, for example, forward uplink data received from the application layer to the SDAP layer, or forward downlink data received from the SDAP layer to the application layer.

(4) Structure of the Access Network Device

Figure 1B:
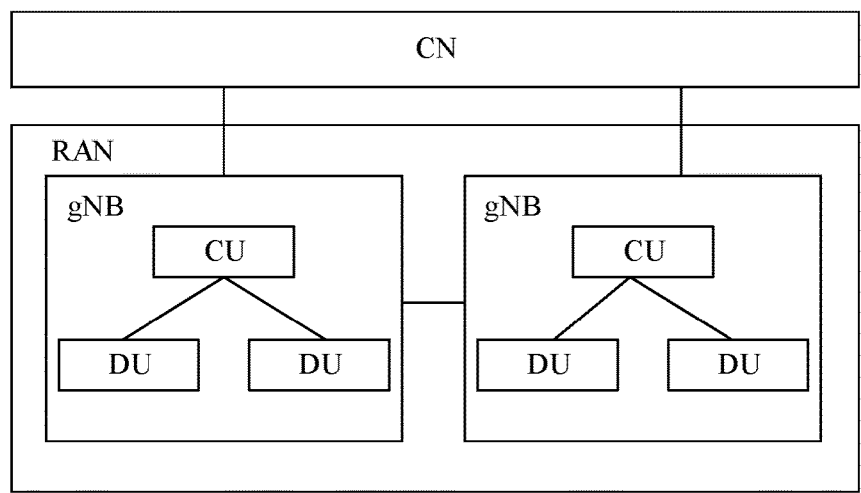
FIG. 1B is a schematic diagram of a structure of an access network device having a split architecture.

The access network device may include a central unit (CU) and a distributed unit (DU). A plurality of DUs may be controlled by one CU in a centralized manner. For example, an interface between the CU and the DU may be referred to as an F1 interface. A control plane (CP) interface may be F1-C, and a user plane (UP) interface may be F1-U. For example, FIG. 1B describes a CU-DU architecture. As FIG. 1B shown, there are two access network devices that access a core network (CN) on a RAN side, and an example in which the access network device is a gNB is used for illustration. Each access network device includes one CU and two DUs that are controlled by the CU in a centralized manner.

The CU and the DU may be obtained through division based on a protocol layer of a radio network. For example, functions of a PDCP layer and a protocol layer above the PDCP layer are set on the CU, and functions of a protocol layer below the PDCP layer (for example, an RLC layer and a MAC layer) are set on the DU. For another example, functions of a protocol layer above the PDCP layer are set on the CU, and functions of the PDCP layer and a protocol layer below the PDCP layer are set on the DU. It may be understood that the foregoing processing function division of the CU and the DU based on the protocol layers is merely an example, and there may be another division. For example, the CU or the DU may be obtained through division to have functions of more protocol layers. For another example, the CU or the DU may be obtained through division to have some processing functions of a protocol layer. In a design, some functions of the RLC layer and functions of a protocol layer above the RLC layer are set on the CU, and remaining functions of the RLC layer and functions of a protocol layer below the RLC layer are set on the DU. In another design, function division of the CU or the DU may alternatively be performed based on a service type or other system requirements. For example, the division may be performed based on a latency, a function whose processing time needs to meet a latency requirement is set on the DU, and a function whose processing time does not need to meet the latency requirement is set on the CU. In another design, the CU may alternatively have one or more functions of the core network. For example, the CU may be disposed on a network side to facilitate centralized management. In another design, a radio unit (RU) of the DU is disposed remotely. The RU has a radio frequency function.

Optionally, the DU and the RU may be obtained through division at the physical layer (PHY). For example, the DU may implement a higher-layer function of the PHY layer, and the RU may implement a lower-layer function of the PHY layer. When used for sending, functions of the PHY layer may include cyclic redundancy check (CRC) code adding, channel encoding, rate matching, scrambling, modulation, layer mapping, precoding, resource mapping, physical antenna mapping, and/or radio frequency sending functions. When used for receiving, functions of the PHY layer may include CRC, channel decoding, rate de-matching, descrambling, demodulation, layer de-mapping, channel detection, resource de-mapping, physical antenna de-mapping, and/or a radio frequency receiving functions. The higher-layer function of the PHY layer may include some functions of the PHY layer. For example, the some functions are closer to the MAC layer. The lower-layer function of the PHY layer may include other functions of the PHY layer. For example, the other functions are closer to the radio frequency function. For example, the higher-layer function of the PHY layer may include CRC code adding, channel encoding, rate matching, scrambling, modulation, and layer mapping, and the lower-layer function of the PHY layer may include precoding, resource mapping, physical antenna mapping, and radio frequency sending functions. Alternatively, the higher-layer function of the PHY layer may include CRC code adding, channel encoding, rate matching, scrambling, modulation, layer mapping, and precoding, and the lower-layer function of the PHY layer may include resource mapping, physical antenna mapping, and radio frequency sending functions.

For example, functions of the CU may be implemented by one entity, or may be implemented by different entities. For example, the functions of the CU may be further divided. In other words, a control plane and a user plane are separated and implemented by using different entities, which are respectively a control plane CU entity (namely, a CU-CP entity) and a user plane CU entity (namely, a CU-UP entity). The CU-CP entity and the CU-UP entity may be coupled to the DU, to jointly complete functions of the access network device.

In the foregoing architecture, signaling generated by the CU may be sent to the terminal device by using the DU, or signaling generated by the terminal device may be sent to the CU by using the DU. For example, signaling at the RRC or PDCP layer is finally processed as signaling at the physical layer and sent to the terminal device, or is converted from signaling received from the physical layer. In this architecture, the signaling at the RRC layer or PDCP layer may be considered to be sent by using the DU, or sent by using the DU and the RU.

Optionally, any one of the DU, the CU, the CU-CP, the CU-UP, and the RU may be a software module, a hardware structure, or a combination of a software module and a hardware structure. This is not limited. Different entities may exist in different forms. This is not limited. For example, the DU, the CU, the CU-CP, and the CU-UP are software modules, and the RU is a hardware structure. These modules and methods performed by the modules also fall within the protection scope of the present disclosure.

It should be understood that a quantity and a type of each device in the communication system shown in FIG. 1A are merely used as an example, and the present disclosure is not limited thereto. In actual application, the communication system may further include more terminal devices and more access network devices, and may further include other network elements, for example, may include a network management element and a core network device. Based on actual requirements of a carrier for network operation, the network management element may classify management of a network into three types: operation, administration, and maintenance. The network management element may also be referred to as an operation, administration and maintenance (OAM) network element, or OAM for short. Operation refers to analyzing, predicting, planning, and configuring a routine network and services. Maintenance refers to routine operations such as network and service testing and fault management. The network management element can detect a network running status, optimize network connections and performance, improve network stability, and reduce network maintenance costs.

The method provided in the present disclosure may be used for communication between the access network device and the terminal device, or may be used for communication between other communication devices, for example, communication between a macro base station and a micro base station in a wireless backhaul link, or communication between two terminal devices in a sidelink (SL). This is not limited.

The method provided in the present disclosure relates to AI. AI may be implemented by using various possible technologies, for example, by using a machine learning technology. In the present disclosure, the communication system may also include a network element that implements an artificial intelligence function. For example, the AI function (for example, an AI module or an AI entity) may be configured in an existing network element in the communication system to implement an AI-related operation. For example, in a 5G new radio (NR) system, the existing network element may be an access network device (such as a gNB), a terminal device, a core network device, operation, administration and maintenance (OAM), a radio access network intelligent controller (RIC), or the like. Alternatively, an independent network element may be introduced into the communication system to perform an AI-related operation. The independent network element may be referred to as an AI network element, an AI node, or the like. The name is not limited in the present disclosure. In this case, the network element that performs the AI-related operation is a network element with a built-in AI function (for example, an AI module or an AI entity). The AI-related operation may also be referred to as the AI function. For details about the AI function, refer to the following descriptions. The AI network element may be directly connected to the access network device in the communication system, or may be indirectly connected to the access network device via a third-party network element. The third-party network element may be a core network element such as an authentication management function (AMF) network element or a user plane function (UPF) network element. In the present disclosure, an example in which the existing network element is equipped with the built-in AI function is used for description.

For ease of understanding, the following describes some terms of AI in the present disclosure with reference to A1 to A3. It may be understood that the descriptions are not intended to limit the present disclosure.

A1: AI model

The AI model is an implementation of an AI function. The AI model represents a mapping relationship between a model input and a model output. The AI model may be a neural network or another machine learning model. In the present disclosure, the AI model may be referred to as a model for short. AI model design includes the following three phases: a data collection phase (for example, collecting training data and/or inference data), a model training phase, and a model inference phase. Further, a model application phase may be further included. In the present disclosure, the AI function may include at least one of the following: data collection (collecting training data and/or inference data), data preprocessing, model training (which is alternatively referred to as model learning), model information release (configuring model information), inference, or inference result release. Inference may also be referred to as prediction.

Figure 2:
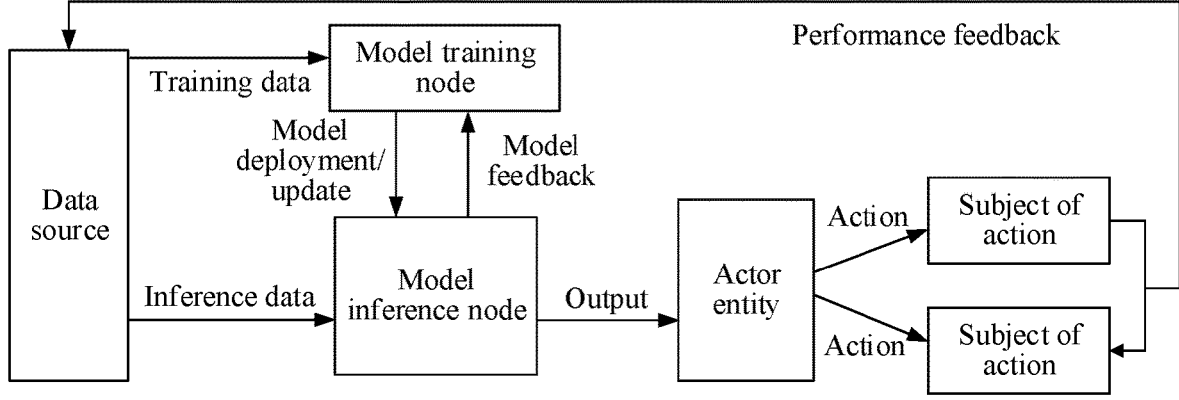
FIG. 2 is a schematic diagram of an AI application framework.

FIG. 2 shows an AI application framework. In FIG. 2, a data source is used to store training data and inference data. In correspondence to the foregoing data collection phase, data stored in the data source may be obtained from a network element that is for collecting (which may also be described as gathering, measuring, or the like) the training data and/or the inference data. In the model training phase, a model training node analyzes or trains the training data provided by the data source to obtain an AI model, and deploys the AI model in a model inference node. The AI model represents a mapping relationship between a model input and a model output. Obtaining the AI model through learning by the model training node is equivalent to obtaining the mapping relationship between the model input and the model output through learning by the model training node by using the training data. In the model inference phase, the model inference node uses a trained AI model to perform inference based on the inference data provided by the data source and obtain an inference result. The method may also be described as follows: The model inference node inputs the inference data to the AI model, and obtains an output by using the AI model. The output is the inference result. The inference result may indicate a configuration parameter used by a subject of action, and/or an operation performed by the subject of action. The inference result is released in the model application phase. For example, the inference result may be uniformly planned by an actor entity, and sent to one or more subjects of action (for example, a core network device, an access network device, or a terminal device) for action.

The AI application framework shown in FIG. 2 may be applied to a same network element in a communication system. In other words, one network element may be responsible for data collection, model training, model inference, and inference result release. Alternatively, different phases in the foregoing AI application framework may be implemented by different network elements or nodes. For example, a data collection node, the model training node, and the model inference node. The data collection node may be configured to collect the training data and/or the inference data. Correspondingly, it may be understood that the data stored in the data source shown in FIG. 2 is from the data collection node, or it may be understood that the data source shown in FIG. 2 is the data collection node, and has a function of collecting the training data and/or the inference data. The model training node may be configured to perform model training, for example, train a model based on the training data. The model inference node is configured to perform model inference and output the inference result.

A2: Training Data

The training data may include an AI model input, or include an AI model input and a target output (label), and is used for AI model training. For example, the training data includes a plurality of training samples, and each training sample is one input of a neural network. The training data may also be understood as a set of training samples, or referred to as a training dataset.

A training dataset is an important part of machine learning. In essence, the model training phase is to learn some features of the training data from the training data, so that the AI model output is as close as possible to the target output. For example, a difference between the AI model output and the target output is minimized. The target output may also be referred to as a label.

A3: Inference Data

The inference data may be used as a trained AI model input, and is used for AI model inference. In the model inference phase, the inference data is input to an AI model, and a corresponding output may be obtained. The output is an inference result. The inference result may be applied to related network scenarios. Alternatively, it may be understood that, in a model training process, model training may be performed based on a requirement of a network scenario, so that an inference result obtained in a model inference process can be applied to the network scenario.

The present disclosure provides solutions for attacks that may cause security and privacy threats to the AI model. The following describes some possible security and privacy threats in the model training phase and the model inference phase.

For example, the security and privacy threats in the model training phase include a training data poisoning attack, a backdoor attack, or a training data privacy leakage.

The training data poisoning attack is also referred to as a training data pollution attack, and occurs in the model training phase. An attacker modifies training data to obtain an incorrect correspondence during model training. Consequently, a model inference result is incorrect. The attacker has capabilities of obtaining, modifying, or creating a training dataset, and has background knowledge such as a label of the training dataset. An attack target is the training dataset. For example, in a training process of an online spam filtering model, a large quantity of poisoning mails are generated, and consequently a spam discriminator cannot perform normal judgment, or a facial recognition system is faulty. Poisoning attacks can be implemented by manipulating model inputs, modifying the training data, or losing or destroying features. In a supervised learning scenario, the training data includes two parts: a label and input data. Therefore, the poisoning attacks on the training data may also include poisoning on the label and poisoning on the input data. Most poisoning attacks focus on data and algorithms. Therefore, defense methods are mainly performed to protect the data and the algorithms. Most defense mechanisms against the poisoning attacks depend on a default fact that a poisoning sample distribution is usually outside an expected input distribution. Therefore, poisoning samples may be considered as outliers and training samples may be purified by using data cleansing (in other words, attack detection and deletion) and robust learning (in other words, learning algorithms based on robust statistics that are essentially insensitive to edge training samples).

The backdoor attack is to embed a hidden backdoor into a model, such as a deep neural network (DNN) model. When the backdoor is activated by an attacker, a model output (prediction result) may be modified by the attacker to a specified target type. When the backdoor is not activated, an infected model has a normal performance on a benign test sample, and is similar to a model trained in a benign setting. The backdoor may be understood as a hidden channel that bypasses security detection. The backdoor attack is usually applied to the model training process. Because the infected model runs normally in the benign setting, and the backdoor can be activated only by a trigger specified by the attacker, it is difficult for a user to realize an existence of the backdoor. A backdoor attack having good invisibility poses a serious threat to an artificial intelligence system. Backdoor attack defense methods can be classified into an experience-based backdoor defense method and a theoretical proof-based backdoor defense method. The experience-based backdoor defense method generally includes input preprocessing, model reconstruction, trigger inversion, model training algorithm robustness enhancement, sample filtering, and the like. The theoretical proof-based backdoor defense method can theoretically ensure effectiveness of defense, but effect of theoretical proof-based backdoor defense method in practice is usually weaker than effect of the experience-based backdoor defense method.

The training data privacy leakage means that data leakage may occur during model training. Currently, most companies or model providers perform model training in centralized learning manners. In this case, a large quantity of user data needs to be collected. However, there is no unified standard for protecting user privacy during user data collection. Consequently, a problem of a user data privacy leakage may be caused during the user data collection. For training data privacy protection, a differential privacy solution that perturbation is added to input parameters and intermediate parameters, secure multi-party computation, homomorphic encryption, and the like may be used.

For example, the security and privacy threats in the model inference phase include an adversarial example attack and an inquiry attack, where the inquiry attack includes a member inference attack, a model inversion attack, a model extraction attack, or the like.

An adversarial example (AE) attack is also referred to as an adversarial instance attack. The adversarial example attack occurs in the model inference phase. An attacker attempts to change a model input feature by using various methods to bypass model detection in a real task, or directly attacks a model to damage integrity of the model. In this way, an adversarial objective is achieved. Based on an attack capability of the attacker to a machine learning model, attacks maybe classified into a white-box attack and a black-box attack. Adversarial example defense methods mainly include data enhancement, input reconstruction, network distillation, adversarial training, gradient hiding, gradient regularization, and the like.

A model extraction attack is an attack manner in which an attacker performs application programming interface (API) query on a trained model to illegally steal a model parameter and a model structure, and construct a substitute model, or even illegally obtain the model. If the attacker obtains information such as the model parameter and the model structure by using the model extraction attack, the attacker may further more conveniently implement malicious attacks such as a poisoning attack and an adversarial attack. Therefore, model leakage caused by the model extraction attack poses a great threat, and brings huge losses to a model creator. To defend against the model extraction attack, methods such as output perturbation, model watermarking, sub-optimal selection, and the like can be used.

Based on this, the present disclosure provides a communication method and apparatus, to improve AI security. In the present disclosure, collected data may be processed based on an anti-attack policy, to obtain more reliable training data and/or inference data. The following describes in detail the communication method provided in the present disclosure with reference to the accompanying drawings.

The communication method provided in the present disclosure may be applied to the communication system shown in FIG. 1A. The access network device may generate an anti-attack policy. For example, the access network device may be a model training node, and configures an anti-attack policy corresponding to a model training phase. For example, the access network device may be a model inference node, and generates an anti-attack policy corresponding to a model inference phase. The terminal device can be configured to collect data. The following describes in detail a manner in which the collected data is processed based on the anti-attack policy.

Figure 3A:
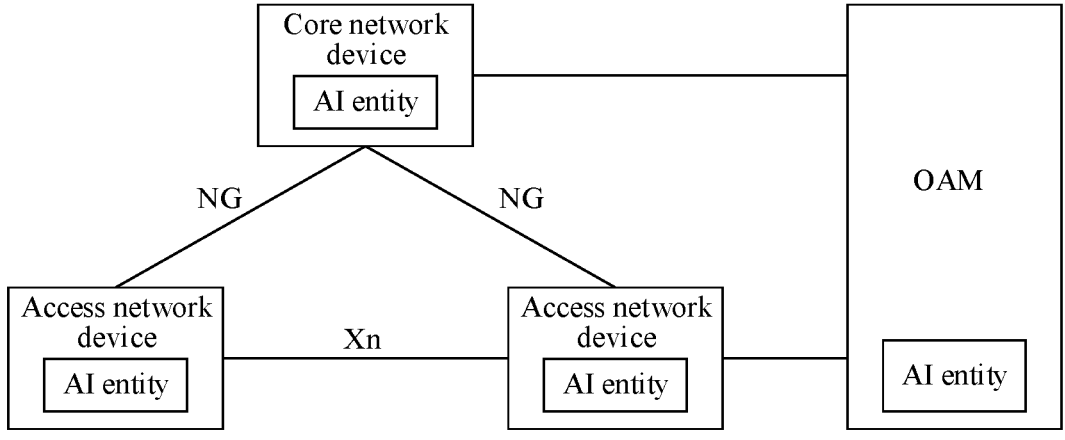
FIG. 3A is a schematic diagram of a network architecture.

FIG. 3A is an example diagram of a network architecture to which a method according to the present disclosure can be applied. As shown in FIG. 3A, optionally, an access network device includes one or more AI entities, and optionally, OAM includes one or more AI entities. Optionally, a core network device includes one or more AI entities. For understanding a function of the AI entity, refer to the foregoing AI function. When both the OAM and the core network device include AI entities, models obtained by training the AI entities of the OAM and the core network device are different, and/or models used for inference may be different.

In the present disclosure, that the models are different means that at least one of the following is different: a structure parameter (for example, a quantity of layers and/or a weight of a model) of the model, an input parameter of the model, or an output parameter of the model.

Figure 3B:
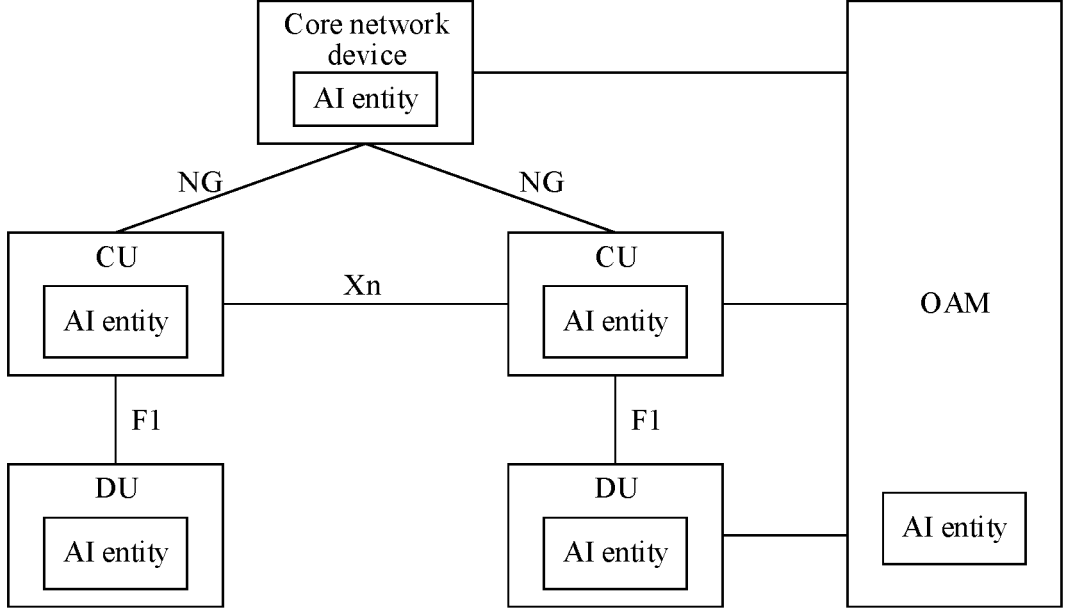
FIG. 3B is a schematic diagram of another network architecture.

FIG. 3B is an example diagram of a network architecture to which a method according to the present disclosure can be applied. Compared with FIG. 3A, an access network device in FIG. 3B is separated into a CU and a DU. Optionally, the CU may include an AI entity. Optionally, the DU may include an AI entity. For understanding a function of the AI entity, refer to the foregoing AI function. When both the CU and the DU include AI entities, models obtained by training the AI entities of the CU and the DU are different, and/or models used for inference are different. Optionally, the CU in FIG. 3B may be further split into a CU-CP and a CU-UP. Optionally, one or more AI entities may be deployed in the CU-CP, and/or one or more AI entities may be deployed in the CU-UP. Optionally, in FIG. 3A or FIG. 3B, OAM of the access network device and OAM of the core network device may be independently deployed.

The following describes in detail communication methods provided in the present disclosure with reference to Solution 1 to Solution 4. In these methods, steps or operations included are merely examples, and other operations or variations of various operations may be further performed in the present disclosure. In addition, the steps may be performed in different sequences presented in the present disclosure, and not all operations may need to be performed.

Solution 1

Figure 4:
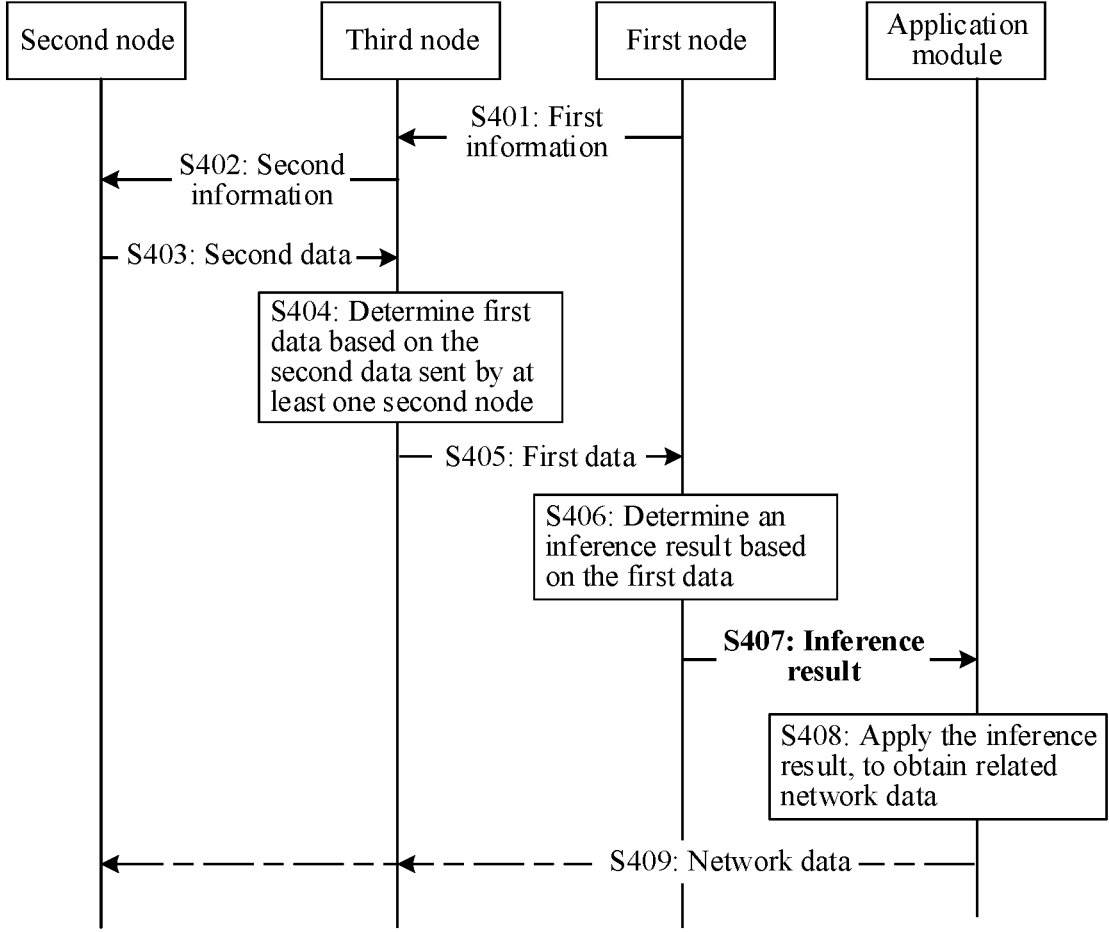
FIG. 4 is a schematic flowchart of a communication method according to the present disclosure.

FIG. 4 shows a communication method. The method mainly includes the following procedures.

S401: A third node obtains first information, where the first information indicates an anti-attack policy of first data, and the first data includes training data and/or inference data of a model.

For example, the third node obtains the first information from a first node. The first node is configured to perform model training and/or inference. Alternatively, it may be understood that the first node is an entity having AI functions such as data preprocessing, model training, and/or model inference. Alternatively, it may be understood that the first node is a network element in which an AI entity is deployed, or an AI entity. For example, the first node may an OAM network element, the first node may be a core network device, the first node may be an RIC, or the first node may be a node on a RAN side, for example, an access network device (such as a gNB), or a CU of an access network device using a split architecture. The third node may be a node on the RAN side, for example, an access network device, a CU of an access network device using a split architecture, or a DU of an access network device using a split architecture.

The first node may indicate, by using the first information, for the third node to determine the first data. The following describes the first information in detail. For example, the first information includes at least one of the following: data source blocklist information of the first data and/or data source trustlist information of the first data; information indicating a data preprocessing manner of the first data; information indicating a data enhancement manner of the first data; or a granularity of the anti-attack policy.

The data source blocklist information indicates a data source having an attack property. The data source trustlist information indicates a reliable data source. The first node may indicate, by sending the data source blocklist information of the first data and/or the data source trustlist information of the first data, for the third node to identify a data source, for example, determine data whose source does not belong to a blocklist or data whose source belongs to a trustlist as the first data. Optionally, the first node may further add a filtering rule (for example, Cluster-FL clustering) or a data cleaning requirement (for example, removing an improper value, a contradictory value, or association verification) to the data source blocklist information of the first data and/or the data source trustlist information of the first data.

The data preprocessing manner may be a data preprocessing rule configured corresponding to a related attack means, and the data preprocessing rule may be used to preprocess collected data (for example, original data), to determine the first data. For example, for a backdoor attack, the first node indicates, by sending the information indicating the data preprocessing manner of the first data, to the third node, a data preprocessing rule configured corresponding to the backdoor attack. The data preprocessing rule configured corresponding to the backdoor attack includes a data tailoring rule, a data conversion rule, a filtering rule of a backdoor trigger sample, and/or the like.

The data enhancement manner may be a data enhancement manner or an input sample reconstruction rule configured corresponding to a related attack means, and the data enhancement manner or the input sample reconstruction rule may be used to enhance collected data (for example, original data), to determine the first data. For example, for an adversarial example attack, the first node may indicate, by sending the information indicating the data enhancement manner of the first data, to the third node, a data enhancement manner or an input sample reconstruction rule configured corresponding to the adversarial example attack. The data enhancement manner or the input sample reconstruction rule configured corresponding to the adversarial example attack may include processing solutions such as data conversion, noise adding, noise removal, auto encoding, and/or differential perturbation. The differential perturbation may also be used to protect data privacy, for example, to prevent a training data privacy leakage. An example in which the differential perturbation is used to protect the data privacy (which is alternatively referred to as a differential privacy solution) is used. The first node may indicate a perturbation rule of the differential privacy solution to the third node. The perturbation rule of the differential privacy solution may include parameters such as a privacy budget $\varepsilon$, sensitivity $\delta$, a tailoring threshold, and a distortion coefficient, and may further include a differential privacy type, a target object of the differential privacy solution, a subject of action that implements differential privacy adding perturbation, and the like.

The granularity of the anti-attack policy may indicate a data source for which the anti-attack policy needs to be implemented, for example, a terminal device level, a cell level, a network slice level, a data radio bearer (DRB) level, an access network device (such as a gNB) level, a CU level of an access network device using a split architecture, or a DU level of an access network device using a split architecture. For example, the terminal device level indicates that the anti-attack policy is implemented for each terminal device. Optionally, the first node may further indicate, by using the granularity of the anti-attack policy, that different data sources correspond to different anti-attack policies. For example, an association relationship between an anti-attack policy and a data source is established. For example, original data from a specified data source is processed based on a data source blocklist and/or a data source trustlist. For example, an anti-attack policy for preventing the backdoor attack is implemented for data from a specified data source. In other words, data preprocessing is performed in the data preprocessing manner. For example, an anti-attack policy for preventing the adversarial example attack is implemented for data from a specified data source. In other words, data enhancement is performed in the data enhancement manner.

In addition, for different data sources, the first node may further indicate a data collection rule or a data collection configuration. For example, the first node may further include the data collection configuration in the first information. The data collection configuration includes a data type of the collected data, for example, a channel measurement type and a cell load type; a specified time period for collecting data, for example, collecting data from 19:00 to 19:05; and a specified data source for collecting data, for example, an indication of collecting data of a cell having a specified cell identifier (ID).

The third node may determine the first data based on the first information. Specifically, refer to S402 to S404 for implementation.

S402: The third node sends second information to at least one second node based on the first information.

For example, FIG. 4 shows one second node.

The second node may communicate with the third node, and the second node may be a node whose type is the same as or different from that of the third node. For example, the third node is an access network device or a CU of an access network device having a split architecture, and the second node may be another access network device or a CU of another access network device having a split architecture. The third node may send the second information to the second node through an Xn interface. For example, the third node is a CU of an access network device having a split architecture, and the second node may be a DU of the access network device having the split architecture. The third node may send the second information to the first node through an F1 interface. For example, the third node is an access network device, and the second node is a terminal device. The third node may send the second information to the second node through a Uu interface. For example, the third node is a CU of an access network device having a split architecture, and the second node is a terminal device. The third node may send the second information to a DU through an F1 interface, and then the DU may forward the second information to the second node through a Uu interface. This is not limited in the present disclosure.

Optionally, the third node and the at least one second node may form a data collection module. The third node may be understood as a cluster node in the data collection module, and functions as a relay between the at least one second node and the first node. Each second node may be understood as a data collection subnode configured to collect data. The first information obtained by the third node from the first node may be understood as an anti-attack policy set indicated by the first node to the data collection module. The third node may determine, based on the anti-attack policy set, to distribute a corresponding anti-attack policy to each second node, for example, indicate, by sending the second information, the anti-attack policy corresponding to the second node.

In this solution, the second information indicates the anti-attack policy of second data, and the first data includes the second data. The second node may determine the second data based on the anti-attack policy indicated by the second information from the third node. Alternatively, it may be understood that the second node is configured to collect data (which may be understood as original data), and execute a corresponding anti-attack policy on the collected data, to obtain the second data. The original data may also be described as third data. The third data is the data collected by the second node, or data obtained before processing based on the anti-attack policy.

Optionally, the third node may indicate different anti-attack policies for different second nodes. In other words, the second information sent to different second nodes may indicate different anti-attack policies. For example, the third node may indicate corresponding second information to each second node based on the granularity of the anti-attack policy and the data collection configuration described in S401.

Optionally, second information sent to one second node may include at least one of the following: data source blocklist information of the second data and/or data source trustlist information of the second data; information indicating a data preprocessing manner of the second data; information indicating a data enhancement manner of the second data; or the granularity of the anti-attack policy. It should be noted that content included in the second information may be the same as or different from content included in the first information. For example, the content included in the second information may be less than the content included in the first information. For example, the first information includes the data source blocklist information of the first data and/or the data source trustlist information of the first data; the information indicating the data preprocessing manner of the first data; and the information indicating the data enhancement manner of the first data. The second information may include a part of the content included in the first information, such as the information indicating the data preprocessing manner of the second data. The second data herein may be a part or all of the first data. Specifically, the third node may determine, based on an actual requirement, content of second information indicated to a second node. This is not limited in the present disclosure.

S403: The at least one second node sends the second data to the third node.

Optionally, if a data collection configuration obtained by the second node indicates a time period for collecting the data, the second node may mark the data collection time period when sending the second data to the third node.

S404: The third node determines the first data based on the second data sent by the at least one second node.

For example, the third node may determine the first data based on the data collection configuration indicated by the first node and the second data sent by the at least one second node.

S405: The third node sends the first data to the first node.

For example, the first data includes the training data, and the first node may perform model training based on the first data. For example, the first data includes the inference data, and the first node may perform model inference based on the first data, to obtain an inference structure. In the present disclosure, an example in which the first node performs model inference based on the first data is used to show an optional model application phase. Refer to S406 to S408 for implementation.

S406: The first node determines the inference result based on the first data.

For example, the inference result may be a prediction result, a policy instruction, or the like for different objectives, such as network energy saving and mobility optimization. For example, for the network energy saving, the inference result may include an energy saving measure, duration, a load threshold for entering and exiting an energy saving state, and the like.

S407: The first node sends the inference result to an application module.

The application module may be understood as a module of an application model, for example, including the actor entity and the subject of action shown in FIG. 2.

Specifically, the application module may have a tiered structure or a direct-selling structure. The tiered structure means that the application module includes a cluster node and a member node (which is alternatively referred to as an application subnode) managed by the cluster node. The first node sends the inference result to the cluster node in the application module, and then the cluster node distributes a part or all of the inference result to the member node based on a requirement of the member node managed by the cluster node. The application module may include one or more cluster nodes, and each cluster node may manage one or more member nodes. This is not limited in the present disclosure. For example, a type of the cluster node may be an access network device or a CU of an access network device having a split architecture, and a type of the member node may be another access network device, a CU of another access network device having a split architecture, a terminal device, or the like. The direct-selling structure means that the application module includes one or more fourth nodes. The first node sends the inference result to the one or more fourth nodes. A type of the fourth node may be an access network device, a CU of an access network device having a split architecture, a DU of an access network device having a split architecture, a terminal device, or the like. In addition, it should be noted that a data collection range corresponding to the data collection module and an application range corresponding to the application module may be completely the same or partially overlapped. For example, inference data in a specified network area is collected, and an inference result is only applied to the specified network area. A node in the data collection module and a node in the application module may partially overlap, or it may be understood that a node in the application module may be the same as the third node and/or some of the at least one second node.

S408: The application module applies the inference result, to obtain related network data. For example, the node in the application module may perform network energy saving based on the inference result.

Further, in FIG. 4, after S408, an optional step S409 is further shown by using a dashed line.

Figure 5:
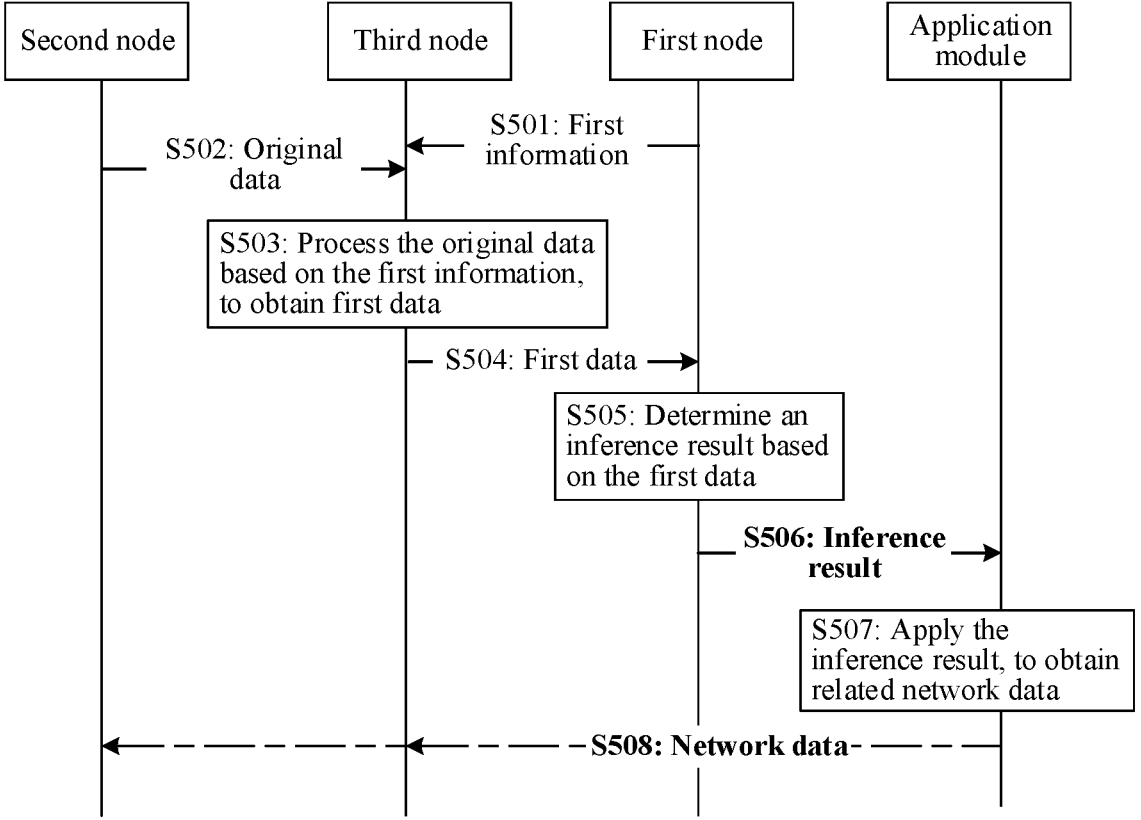
FIG. 5 is a schematic flowchart of a communication method according to the present disclosure.

S409: The application module sends, to the data collection module such as the third node and/or the second node, the network data obtained by applying the inference result. For example, FIG. 5 shows that an application module sends network data to a third node and a second node.

Optionally, the network data described in S409 may also be understood as data (which may be understood as the original data) collected by the data collection module.

The collected data may be used for model training, inference, update, or the like. For example, for a trained model, it is assumed that the application module uses the direct-selling structure, and the application module includes a fourth node that is different from the second node and the third node. The fourth node may send, to the second node, network data obtained by applying the inference result by the fourth node, and the second node may process the network data based on the anti-attack policy indicated by the second information, to obtain new second data, and send the new second data to the third node. In this case, the third node may also indicate, based on the new second data, the first node to update the first data. The first node may further perform model update based on updated first data.

In the present disclosure, the anti-attack policy corresponding to the training data and/or the inference data is configured, and anti-attack processing is performed in a data collection phase, to reduce security and privacy threats caused by attacks. This can enhance reliability of the training data and/or the inference data, and improve AI security.

Solution 2

FIG. 5 shows a communication method. The method mainly includes the following procedures.

S501: A third node obtains first information, where the first information indicates an anti-attack policy of first data, and the first data includes training data and/or inference data of a model.

For example, the third node obtains the first information from a first node. For implementation of this step, refer to S401. Details are not described in the present disclosure again.

S502: The third node obtains original data from at least one second node.

The original data may be data collected by the second node. For example, in correspondence to a scenario requirement of model training or model inference, the second node may collect related original data.

Optionally, the third node may send a data collection configuration to the at least one second node. The data collection configuration herein may be understood based on the content described in S401. For example, the third node may obtain the data collection configuration from the first node, and indicate, to each second node, a type of data collected by the second node, a time period for collecting the data by the second node, and the like based on the data collection configuration.

S503: The third node processes the original data based on the first information, to obtain the first data.

For understanding of this step, refer to a manner in which the second node determines the second data based on the second information in S402. Specifically, the third node may execute, on the original data, the anti-attack policy indicated by the first information, to obtain the first data.

S504: The third node sends the first data to the first node.

For execution of this step, refer to S405. Details are not described in the present disclosure again.

S505: The first node determines an inference result based on the first data.

For execution of this step, refer to S406. Details are not described in the present disclosure again.

S506: The first node sends the inference result to an application module.

For execution of this step, refer to S407. Details are not described in the present disclosure again.

S507: The application module applies the inference result, to obtain related network data.

For example, a node in the application module may perform network energy saving based on the inference result.

Further, in FIG. 5, after S507, an optional step S508 is further shown by using a dashed line.

S508: The application module sends, to a data collection module such as the third node and/or the second node, the network data obtained by applying the inference result. For example, FIG. 5 shows that the application module sends the network data to the third node and the second node.

Optionally, the network data described in S508 may also be understood as data (which is alternatively referred to as the original data) collected by the data collection module.

The collected data may be used for model training, inference, update, or the like. For example, for a trained model, it is assumed that the application module uses a direct-selling structure, and the application module includes a fourth node that is the same as the second node. The fourth node may send, to the third node, network data obtained by applying the inference result by the fourth node, and the third node may process the network data based on the anti-attack policy indicated by the first information, to obtain new first data, and send the new first data to the first node. The first node may further perform model update based on the updated first data.

In the present disclosure, the anti-attack policy corresponding to the training data and/or the inference data is configured, and anti-attack processing is performed on the collected original data in a data collection phase, to obtain reliable training data and/or inference data. This reduces security and privacy threats caused by attacks, and can improve AI security.

Solution 3

Figure 6:
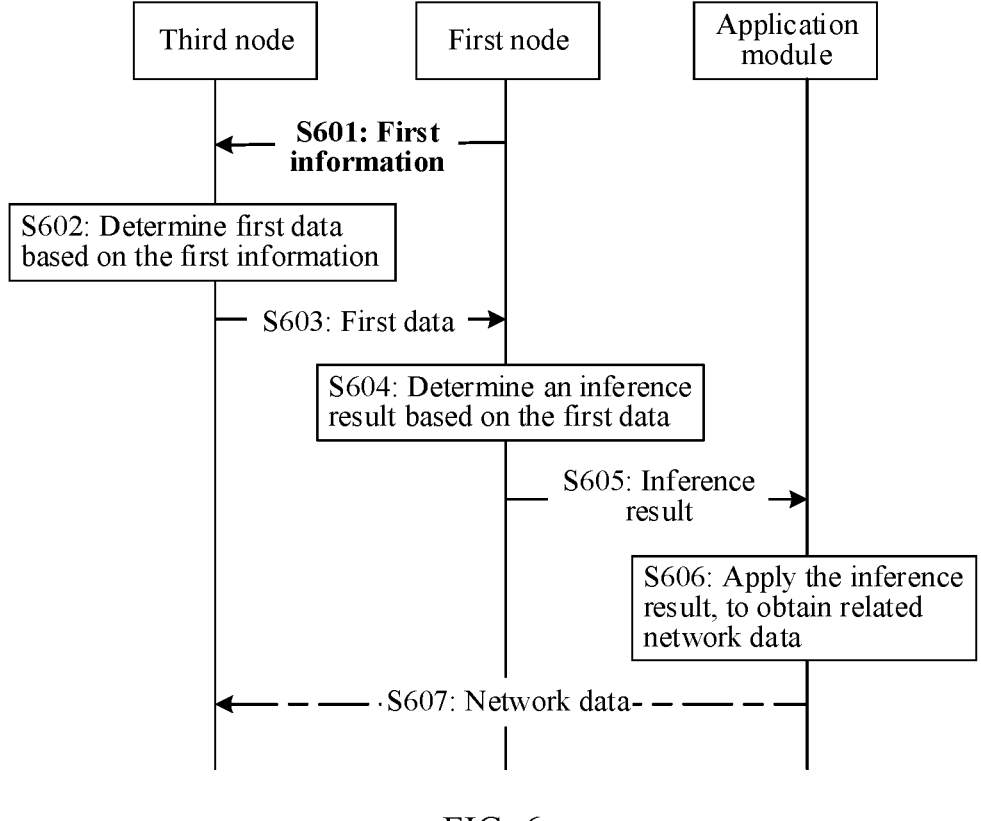
FIG. 6 is a schematic flowchart of a communication method according to the present disclosure.

FIG. 6 shows a communication method. The method mainly includes the following procedures.

S601: A first node sends first information to at least one third node.

For example, FIG. 6 shows one third node.

The first information indicates an anti-attack policy of first data, and the first data includes training data and/or inference data of a model. Optionally, for a third node, the third node may obtain, from the first node, first information corresponding to the third node. For implementation of this step, refer to S401. Details are not described in the present disclosure again.

In addition, it should be noted that, based on descriptions in S401, a type of the third node in this solution may alternatively be a terminal device.

S602: The at least one third node determines the first data based on the received first information.

Specifically, for any third node, the third node may collect related original data, and process the original data based on the first information, to obtain the first data. That the third node collects and processes the original data may be understood with reference to implementations in which the second node collects and processes the original data in S502 and S503. Details are not described in the present disclosure again.

S603: The at least one third node sends the first data to the first node.

For execution of this step, refer to S405. Details are not described in the present disclosure again.

S604: The first node determines an inference result based on the first data.

For execution of this step, refer to S406. Details are not described in the present disclosure again.

S605: The first node sends the inference result to an application module.

For execution of this step, refer to S407. Details are not described in the present disclosure again.

S606: The application module applies the inference result, to obtain related network data.

For example, a node in the application module may perform network energy saving based on the inference result.

Further, optionally, the network data may further be used for model training, inference, update, or the like. For example, for a node that is in the application module and that is the same as the third node, this type of node may further execute the anti-attack policy on the network data based on the first information, to obtain new first data, and send the new first data to the first node. In this case, the first node may further perform model update based on the updated first data. For another example, for a node that is in the application module and that is different from the third node, this type of node may further send the network data to the third node. In this case, the network data may also be understood as the original data collected by the third node. Further, the third node may also execute the anti-attack policy on the network data based on the first information, to obtain new first data, and send the new first data to the first node. In this case, the first node may further perform model update based on the updated first data.

For example, in FIG. 6, after S606, an optional step S607 is further shown by using a dashed line. S607: The application module sends, to a data collection module such as the at least one third node, the network data obtained by applying the inference result.

In the present disclosure, a direct-selling manner is used to configure the anti-attack policy corresponding to the training data and/or the inference data for at least one node that is configured to collect data, and anti-attack processing is performed on the collected original data in a data collection phase, to obtain reliable training data and/or inference data. This reduces security and privacy threats caused by attacks, and can improve AI security.

Solution 4

Figure 7:
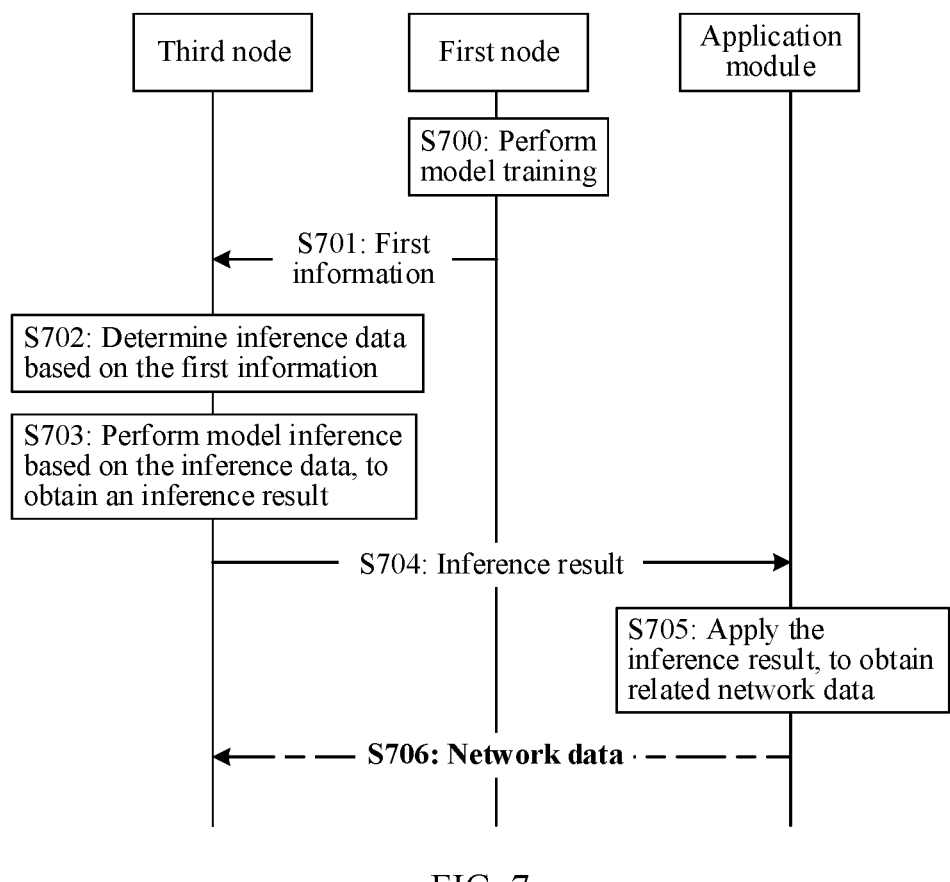
FIG. 7 is a schematic flowchart of a communication method according to the present disclosure.

In correspondence to an AI application framework, this solution describes a solution in which a model training node indicates an anti-attack policy to a model inference node. FIG. 7 shows a communication method. In the following, a first node is a model training node in an AI application framework, and a third node is a model inference node in the AI application framework. The method mainly includes the following procedures.

S700: The first node performs model training.

The first node may be OAM or a core network device, and may have training data collection, data preprocessing, and model training functions.

S701: The first node sends first information to the third node.

The third node may be a node such as an access network device, a CU of an access network device having a split architecture, a DU of an access network device having a split architecture, or a terminal device, on a RAN side. The third node has inference data collection, data preprocessing, and model inference functions.

The first information indicates an anti-attack policy of first data, and the first data includes training data and/or inference data of a model. Optionally, for a third node, the third node may obtain, from the first node, first information corresponding to the third node. For implementation of this step, refer to S401. Details are not described in the present disclosure again.

S702: The third node determines the inference data based on the received first information.

Specifically, for any third node, the third node may collect related original data, and process the original data based on the first information, to obtain the inference data. That the third node collects and processes the original data may be understood with reference to implementations in which the second node collects and processes the original data in S502 and S503. Details are not described in the present disclosure again.

S703: The third node performs model inference based on the inference data, and determines an inference result.

For execution of this step, refer to S406. Details are not described in the present disclosure again.

S704: The third node sends the inference result to an application module.

The application module may be understood as a module of an application model, for example, including the actor entity and the subject of action shown in FIG. 2.

Specifically, the application module may have a tiered structure or a direct-selling structure. The tiered structure means that the application module includes a cluster node and a member node (which is alternatively referred to as an application subnode) managed by the cluster node. The third node sends the inference result to the cluster node in the application module, and then the cluster node distributes a part or all of the inference result to the member node based on a requirement of the member node managed by the cluster node. The application module may include one or more cluster nodes, and each cluster node may manage one or more member nodes. This is not limited in the present disclosure. For example, a type of the cluster node may be an access network device or a CU of an access network device having a split architecture, and a type of the member node may be another access network device, a CU of another access network device having a split architecture, a terminal device, or the like. The direct-selling structure means that the application module includes one or more fourth nodes. The third node sends the inference result to the one or more fourth nodes. A type of the fourth node may be an access network device, a CU of an access network device having a split architecture, a DU of an access network device having a split architecture, a terminal device, or the like. In addition, it should be noted that a data collection range corresponding to a data collection module and an application range corresponding to the application module may be completely the same or partially overlapped. For example, inference data in a specified network area is collected, and an inference result is only applied to the specified network area. Optionally, a node in the application module may include the first node and/or the third node.

S705: The application module applies the inference result, to obtain related network data.

For example, the node in the application module may perform network energy saving based on the inference result.

Further, optionally, the network data may further be used for model training, inference, update, or the like. For example, when the application module includes the first node, the first node may further update model training data by using network data obtained by the first node, and perform model update based on updated model training data. For another example, for a node that is in the application module and that is different from the first node, this type of node may further send network data obtained by the node to the first node and/or the third node, where the network data is used for model update at the first node and/or model inference at the third node. This is not limited in the present disclosure.

For example, in FIG. 7, after S706, an optional step S706 is further shown by using a dashed line.

S706: The application module sends, to the third node, the network data obtained by applying the inference result.

In the present disclosure, the model training node indicates, to the model inference node, the anti-attack policy corresponding to the training data and/or the inference data. The model inference node may determine reliable inference data by executing the anti-attack policy. This reduces security and privacy threats caused by attacks in a model inference phase, and can improve AI security.

The foregoing describes the methods provided in the present disclosure from perspectives of the third node, the first node, the second node, and interaction between the third node, the first node, and the second node. To implement functions in the foregoing methods, the third node, the first node, and the second node may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular application and design constraints of the technical solutions.

Figure 8:
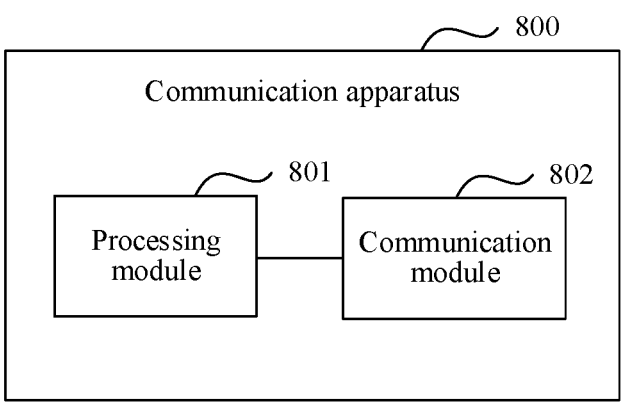
FIG. 8 is a schematic diagram of a structure of a communication apparatus according to the present disclosure.

Based on a same concept, refer to FIG. 8. The present disclosure provides a communication apparatus 800. The communication apparatus 800 includes a processing module 801 and a communication module 802. The communication apparatus 800 may be a third node, or may be a communication apparatus that is used in the third node or is used together with the third node and that can implement a communication method performed on a third node side. Alternatively, the communication apparatus 800 may be a first node, or may be a communication apparatus that is used in the first node or is used together with the first node and that can implement a communication method performed on a first node side. Alternatively, the communication apparatus 800 may be a second node, or may be a communication apparatus that is used in the second node or is used together with the second node and that can implement a communication method performed on a second node side.

The communication module may also be referred to as a transceiver module, a transceiver, a transceiver machine, a transceiver apparatus, or the like. The processing module may also be referred to as a processor, a processing board, a processing unit, a processing apparatus, or the like. Optionally, a component that is in the communication module and that is configured to implement a receiving function may be considered as a receiving unit. It should be understood that the communication module is configured to perform a sending operation and a receiving operation on the first node side or the third node side in the foregoing method embodiments. A component that is in the communication module and that is configured to implement a sending function is considered as a sending unit. In other words, the communication module includes the receiving unit and the sending unit.

When the communication apparatus 800 is used in the third node, the receiving unit included in the communication module 802 of the communication apparatus 800 is configured to perform the receiving operation on the third node side, for example, receive information from the first node. The sending unit included in the communication module 802 of the communication apparatus 800 is configured to perform the sending operation on the third node side, for example, send information to the first node. When the communication apparatus 800 is used in the first node, the receiving unit included in the communication module 802 of the communication apparatus 800 is configured to perform the receiving operation on the first node side, for example, receive information from the third node. The sending unit included in the communication module 802 of the communication apparatus 800 is configured to perform the sending operation on the first node side, for example, send information to the third node. When the communication apparatus 800 is used in the second node, the receiving unit included in the communication module 802 of the communication apparatus 800 is configured to perform a receiving operation on the second node side, for example, receive information from the third node. The sending unit included in the communication module 802 of the communication apparatus 800 is configured to perform a sending operation on the second node side, for example, send information to the third node.

In addition, it should be noted that, if the apparatus is implemented by using a chip/chip circuit, the communication module may be an input/output circuit and/or a communication interface, and performs an input operation (corresponding to the foregoing receiving operation) and an output operation (corresponding to the foregoing sending operation); and the processing module is an integrated processor, a microprocessor, or an integrated circuit.

The following describes in detail an implementation in which the communication apparatus 800 is used in the third node.

The apparatus 800 includes:

the communication module 802, configured to obtain first information, where the first information indicates an anti-attack policy of first data, and the first data includes training data and/or inference data of a model; and the processing module 801, configured to determine the first data based on the first information.

In the foregoing design, the anti-attack policy of the training data and/or the inference data is configured, so that reliability of the training data and/or the inference data can be enhanced, an attack threat in a model training phase and/or a model inference phase can be effectively prevented, and security of artificial intelligence can be improved.

In an optional implementation, the first information includes at least one of the following: data source blocklist information of the first data and/or data source trustlist information of the first data; information indicating a data preprocessing manner of the first data; or information indicating a data enhancement manner of the first data. According to data processing solutions from a plurality of perspectives, the anti-attack policy of the training data and/or the inference data is indicated, so that the reliability of the training data and/or the inference data can be effectively enhanced.

In an optional implementation, the communication module 802 is further configured to obtain the first information from a first node, where the first node is configured to perform model training and/or inference.

In an optional implementation, the communication module 802 is further configured to send the first data to the first node. The first node may perform model training and/or inference by using the first data.

In an optional implementation, the processing module 801 is configured to: send second information to at least one second node based on the first information, where the second information indicates an anti-attack policy of second data, and the first data includes the second data; receive the second data from the at least one second node; and determine the first data based on the second data of the at least one second node.

In the foregoing design, the anti-attack policy of the first data is distributed to the at least one second node, and the at least one second node may determine in parallel a part of the first data, for example, the second data. This helps improve data processing efficiency.

In an optional implementation, the second information includes at least one of the following: data source blocklist information of the second data and/or data source trustlist information of the second data; information indicating a data preprocessing manner of the second data; or information indicating a data enhancement manner of the second data.

In an optional implementation, the communication module 802 is further configured to obtain original data; and the processing module 801 is further configured to process the original data based on the first information, to obtain the first data. In this design, the obtained original data is not directly used for the model training and/or inference, but is processed based on the first information. This can effectively prevent the original data from causing an attack threat in the model training phase/model inference phase. In this way, the security of artificial intelligence is improved.

In an optional implementation, the communication module 802 is further configured to obtain the original data from the at least one second node.

In an optional implementation, the communication module 802 is further configured to obtain data collection configuration information from the first node, where the data collection configuration information includes at least one of the following: a type of the original data; a time period for collecting the original data; or a source of the original data.

In an optional implementation, the first node is configured to perform model training, the first data includes the inference data of the model, and the third node is configured to perform model inference.

The following describes in detail an implementation in which the communication apparatus 800 is used in the first node.

The processing module 801 is configured to send first information by using the communication module 802, where the first information indicates an anti-attack policy of first data, and the first data includes training data and/or inference data of a model.

The communication module 802 is configured to obtain the first data.

In the foregoing design, the anti-attack policy of the training data and/or the inference data is configured, so that reliability of the training data and/or the inference data can be enhanced, an attack threat in the model training phase and/or the model inference phase can be effectively prevented, and the security of artificial intelligence can be improved.

In an optional implementation, the first information includes at least one of the following: data source blocklist information of the first data and/or data source trustlist information of the first data; information indicating a data preprocessing manner of the first data; or information indicating a data enhancement manner of the first data. According to data processing solutions from a plurality of perspectives, the anti-attack policy of the training data and/or the inference data is indicated, so that the reliability of the training data and/or the inference data can be effectively enhanced.

In an optional implementation, the processing module 801 is configured to send the first information to at least one third node by using the communication module 802.

In an optional implementation, the communication module 802 is configured to receive the first data from the at least one third node.

In an optional implementation, the first node is configured to perform model training and/or inference.

The following describes in detail an implementation in which the communication apparatus 800 is used in the second node.

The communication module 802 is configured to obtain second information, where the second information indicates an anti-attack policy of second data, the second data belongs to first data, and the first data includes training data and/or inference data of a model.

The processing module 801 is configured to determine the second data based on the second information.

In an optional implementation, the communication module 802 is further configured to send the second data. For example, the second data is sent to the third node.

In an optional implementation, the second information includes at least one of the following: data source blocklist information of the second data and/or data source trustlist information of the second data; information indicating a data preprocessing manner of the second data; or information indicating a data enhancement manner of the second data.

Division into the modules in the present disclosure is an example, is merely division into logical functions, and may be other division during actual implementation. In addition, functional modules in embodiments of the present disclosure may be integrated into one processor, may exist alone physically, or two or more modules may be integrated into one module. The foregoing integrated module may be implemented in a form of hardware, or may be implemented in a form of a software function module.

Based on a same technical concept, the present disclosure further provides a communication apparatus 900. The communication apparatus 900 may be a chip or a chip system. Optionally, in the present disclosure, the chip system may include a chip, or may include a chip and another discrete component.

The communication apparatus 900 may be configured to implement a function of any network element in the communication systems shown in FIG. 1A, FIG. 3A, and FIG. 3B. The communication apparatus 900 may include at least one processor 910. The processor 910 is coupled to a memory. Optionally, the memory may be located in the apparatus, the memory may be integrated with the processor, or the memory may be located outside the apparatus. For example, the communication apparatus 900 may further include at least one memory 920. The memory 920 stores a computer program, configuration information, instructions, and/or data for implementing any one of the foregoing embodiments. The processor 910 may execute the computer program stored in the memory 920, to complete the method in any one of the foregoing embodiments.

The communication apparatus 900 may further include a communication interface 930, and the communication apparatus 900 may exchange information with another device through the communication interface 930. For example, the communication interface 930 may be a transceiver, a circuit, a bus, a module, a pin, or a communication interface of another type. When the communication apparatus 900 is a chip-type apparatus or circuit, the communication interface 930 in the apparatus 900 may alternatively be an input/output circuit, and may input information (which is alternatively referred to as receiving information) and output information (which is alternatively referred to as sending information). The processor is an integrated processor, a microprocessor, an integrated circuit, or a logic circuit, and the processor may determine the output information based on the input information.

Couplings in the present disclosure are indirect couplings or communication connections between apparatuses, units, or modules in an electrical, mechanical, or another form, and are used for information exchange between the apparatuses, the units, or the modules. The processor 910 may cooperate with the memory 920 and the communication interface 930. A specific connection medium between the processor 910, the memory 920, and the communication interface 930 is not limited in the present disclosure.

Figure 9:
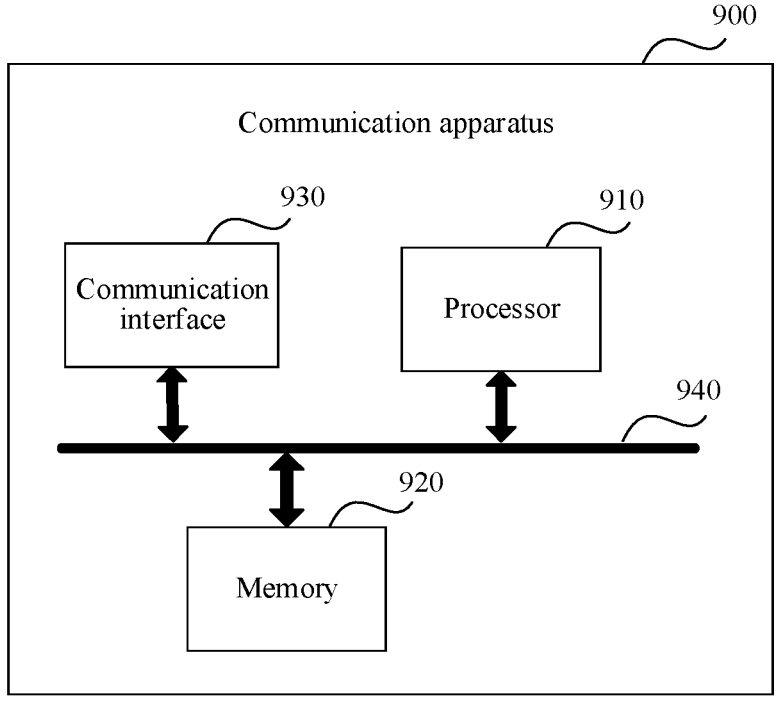
FIG. 9 is a schematic diagram of a structure of a communication apparatus according to the present disclosure.

Optionally, refer to FIG. 9. The processor 910, the memory 920, and the communication interface 930 are connected to each other through a bus 940. The bus 940 may be a peripheral component interconnect (PCI) bus, an extended industry standard architecture (EISA) bus, or the like. The bus may be classified into an address bus, a data bus, a control bus, and the like. For ease of representation, only one thick line is used for representing the bus 940 in FIG. 9, but this does not mean that there is only one bus or only one type of bus.

In the present disclosure, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the present disclosure. The general-purpose processor may be a microprocessor or any conventional processor. The steps of the methods disclosed with reference to the present disclosure may be directly implemented by a hardware processor, or may be implemented by a combination of hardware and software modules in the processor.

In the present disclosure, the memory may be a non-volatile memory, for example, a hard disk drive (HDD) or a solid-state drive (SSD), or may be a volatile memory (volatile memory), for example, a random-access memory (RAM). The memory is any other medium that can be configured to carry or store expected program code in a form of an instruction or a data structure and that can be accessed by a computer, but is not limited thereto. The memory in the present disclosure may be alternatively a circuit or any other apparatus that can implement a storage function, and is configured to store program instructions and/or data.

In a possible implementation, the communication apparatus 900 may be used in a third node. Specifically, the communication apparatus 900 may be the third node, or may be an apparatus that can support the third node in implementing a function of the third node in any one of the foregoing embodiments. The memory 920 stores a computer program, instructions, and/or data for implementing the function of the third node in any one of the foregoing embodiments. The processor 910 may execute the computer program stored in the memory 920, to complete the method performed by the third node in any one of the foregoing embodiments. The communication apparatus is used in the third node. The communication interface in the communication apparatus 900 may be configured to interact with a first node, and send information to the first node or receive information from the first node.

In another possible implementation, the communication apparatus 900 may be used in a first node. Specifically, the communication apparatus 900 may be the first node, or may be an apparatus that can support the first node in implementing a function of the first node in any one of the foregoing embodiments. The memory 920 stores a computer program, instructions, and/or data for implementing the function of the first node in any one of the foregoing embodiments. The processor 910 may execute the computer program stored in the memory 920, to complete the method performed by the first node in any one of the foregoing embodiments. The communication apparatus is used in the first node. The communication interface in the communication apparatus 900 may be configured to interact with a third node, and send information to the third node or receive information from the third node.

In still another possible implementation, the communication apparatus 900 may be used in a second node. Specifically, the communication apparatus 900 may be the second node, or may be an apparatus that can support the second node in implementing a function of the second node in any one of the foregoing embodiments. The memory 920 stores a computer program, instructions, and/or data for implementing the function of the second node in any one of the foregoing embodiments. The processor 910 may execute the computer program stored in the memory 920, to complete the method performed by the second node in any one of the foregoing embodiments. The communication apparatus is used in the second node. The communication interface in the communication apparatus 900 may be configured to interact with a third node, and send information to the third node or receive information from the third node.

The communication apparatus 900 provided in this embodiment may be used in the third node to complete the method performed by the third node, used in the first node to complete the method performed by the first node, or used in the second node to complete the method performed by the second node. Therefore, for technical effects that can be achieved by this embodiment, refer to the foregoing method embodiments. Details are not described herein again.

Based on the foregoing embodiments, the present disclosure further provides a computer program. When the computer program is run on a computer, the computer is enabled to perform, from a perspective of the third node, the first node, or the second node, the communication methods provided in the embodiments shown in FIG. 4 to FIG. 7.

Based on the foregoing embodiments, the present disclosure further provides a computer-readable storage medium. The computer-readable storage medium stores a computer program. When the computer program is executed by a computer, the computer is enabled to perform, from a perspective of the third node, the first node, or the second node, the communication methods provided in the embodiments shown in FIG. 5 to FIG. 8. The storage medium may be any usable medium that can be accessed by the computer.

The following is used as an example but is not limited: The computer-readable medium may include a RAM, a read-only memory (ROM), an electrically erasable programmable read-only memory (EEPROM), a compact disc read-only memory (CD-ROM) or another optical disc storage, a disk storage medium or another disk storage device, or any other medium that can be used to carry or store expected program code in a form of an instruction or a data structure and can be accessed by the computer.

Based on the foregoing embodiments, the present disclosure provides a communication system, including the third node and the first node. The third node and the first node may implement the communication methods provided in the embodiments shown in FIG. 4 to FIG. 7. Further, the communication system may further include the second node, and the second node may implement the communication methods provided in the embodiments shown in FIG. 4 and FIG. 5.

Based on the foregoing embodiments, the present disclosure further provides a chip. The chip is configured to read a computer program stored in a memory, and implement, from a perspective of the third node, the first node, or the second node, the communication methods provided in the embodiments shown in FIG. 4 to FIG. 7.

Based on the foregoing embodiments, the present disclosure provides a chip system. The chip system includes a processor, configured to support a computer apparatus in implementing functions of the third node, the first node, or the second node in the embodiments shown in FIG. 4 to FIG. 7. In a possible design, the chip system further includes a memory, and the memory is configured to store a program and data for the computer apparatus. The chip system may include a chip, or may include a chip and another discrete component.

All or some of technical solutions provided in the present disclosure may be implemented by using software, hardware, firmware, or any combination thereof. When the software is used to implement the technical solutions, all or some of the technical solutions may be implemented in a form of a computer program product. The computer program product includes one or more computer instructions. When the computer program instructions are loaded and executed on a computer, all or some of the procedures or functions according to the present disclosure are generated. The computer may be a general-purpose computer, a dedicated computer, a computer network, the third node, the first node, the second node, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium that may be accessed by the computer, or a data storage device such as a server or a data center, integrating one or more usable media. The usable medium may be a magnetic medium (for example, a floppy disk, a hard disk drive, or a magnetic tape), an optical medium (for example, a digital video disc (DVD)), or a semiconductor medium.

In the present disclosure, on the premise that there is no logical contradiction, the embodiments may be mutually referenced. For example, methods and/or terms in method embodiments may be mutually referenced, functions and/or terms in apparatus embodiments may be mutually referenced, and functions and/or terms in the apparatus embodiments and the method embodiments may be mutually referenced.

A person skilled in the art may make various modifications and variations to the present disclosure without departing from the scope of the present disclosure. In this way, the present disclosure is intended to cover these modifications and variations, provided that the modifications and variations of the present disclosure fall within the scope of the claims of the present disclosure and their equivalent technologies.

What is claimed is:

1. A communication method implemented in a communication network, comprising:

obtaining first information, wherein the first information indicates an anti-attack policy of first data, the first data comprises training data and/or inference data of a model, and the first information comprises at least one of the following: data source blocklist information of the first data and/or data source trustlist information of the first data, information indicating a data preprocessing manner of the first data, or information indicating a data enhancement manner of the first data; wherein the first information further includes a granularity of the anti-attack policy that indicates whether the anti-attack policy is implemented at a terminal device level, a cell level, a network slice level, a data radio bearer level, or an access network device level;

sending second information to at least one second node based on the first information, wherein the second information indicates an anti-attack policy of second data and the first data comprises the second data; and wherein the second information comprises at least one of the following: data source blocklist information of the second data and/or data source trustlist information of the second data, information indicating a data preprocessing manner of the second data, or information indicating a data enhancement manner of the second data;

determining the first data based on the first information; and sending the first data, wherein the first data is used to perform model training and/or determine an inference result.

2. The method according to claim 1, wherein the obtaining first information comprises:

obtaining the first information from a first node, wherein the first node is configured to perform model training and/or inference.

3. The method according to claim 2, wherein the method further comprises:

sending the first data to the first node.

4. The method according to claim 1, wherein the determining the first data based on the first information comprises:

receiving the second data from the at least one second node; and determining the first data based on the second data of the at least one second node.

5. The method according to claim 1, wherein the determining the first data based on the first information comprises:

obtaining original data; and processing the original data based on the first information, to obtain the first data.

6. The method according to claim 5, wherein the obtaining original data comprises:

obtaining the original data from at least one second node.

7. A communication method implemented in a communication network, comprising:

sending first information, wherein the first information indicates an anti-attack policy of first data, the first data comprises training data and/or inference data of a model and the first information comprises at least one of the following: data source blocklist information of the first data and/or data source trustlist information of the first data, information indicating a data preprocessing manner of the first data, or information indicating a data enhancement manner of the first data; wherein the first information further includes a granularity of the anti-attack policy that indicates whether the anti-attack policy is implemented at a terminal device level, a cell level, a network slice level, a data radio bearer level, or an access network device level;

sending second information to at least one second node based on the first information, wherein the second information indicates an anti-attack policy of second data and the first data comprises the second data; and wherein the second information comprises at least one of the following: data source blocklist information of the second data and/or data source trustlist information of the second data, information indicating a data preprocessing manner of the second data, or information indicating a data enhancement manner of the second data;

obtaining the first data; and performing at least one of model training or model inference based on the first data.

8. The method according to claim 7, wherein the sending first information comprises:

sending the first information to at least one third node.

9. The method according to claim 8, wherein the obtaining the first data comprises:

receiving the first data from the at least one third node.

10. The method according to claim 7, wherein the method is performed by a first node, and the first node is configured to perform model training and/or inference.

11. An apparatus, comprising:

at least one processor, and a memory storing instructions for execution by the at least one processor;

wherein, when executed, the instructions cause the apparatus to perform operations comprising:

obtaining first information, wherein the first information indicates an anti-attack policy of first data, the first data comprises training data and/or inference data of a model and the first information comprises at least one of the following: data source blocklist information of the first data and/or data source trustlist information of the first data, information indicating a data preprocessing manner of the first data, or information indicating a data enhancement manner of the first data; wherein the first information further includes a granularity of the anti-attack policy that indicates whether the anti-attack policy is implemented at a terminal device level, a cell level, a network slice level, a data radio bearer level, or an access network device level;

sending second information to at least one second node based on the first information, wherein the second information indicates an anti-attack policy of second data and the first data comprises the second data; and wherein the second information comprises at least one of the following: data source blocklist information of the second data and/or data source trustlist information of the second data, information indicating a data preprocessing manner of the second data, or information indicating a data enhancement manner of the second data;

determining the first data based on the first information; and sending the first data, wherein the first data is used to perform model training and/or determine an inference result.

12. The apparatus according to claim 11, wherein the obtaining first information comprises:

obtaining the first information from a first node, wherein the first node is configured to perform model training and/or inference.

13. The apparatus according to claim 12, wherein, when executed, the instructions cause the apparatus to perform operations comprising:

sending the first data to the first node.

14. The apparatus according to claim 11, wherein the determining the first data based on the first information comprises:

receiving the second data from the at least one second node; and determining the first data based on the second data of the at least one second node.

15. The apparatus according to claim 11, wherein the determining the first data based on the first information comprises:

obtaining original data; and processing the original data based on the first information, to obtain the first data.

* * * * *